May 10, 1966 J. D. EDICK 3,250,933
DYNAMOELECTRIC MACHINE COOLING
Filed Feb. 8, 1963 3 Sheets-Sheet 2

INVENTOR.
JOHN D. EDICK
BY *Woodling, Krost,*
*Granger and Rust*
ATTORNEYS

May 10, 1966  J. D. EDICK  3,250,933
DYNAMOELECTRIC MACHINE COOLING
Filed Feb. 8, 1963  3 Sheets-Sheet 3

INVENTOR.
JOHN D. EDICK
BY Woodling, Krost,
Granger and Rust
ATTORNEYS

United States Patent Office 3,250,933
Patented May 10, 1966

3,250,933
DYNAMOELECTRIC MACHINE COOLING
John D. Edick, Wickliffe, Ohio, assignor to Reliance Electric and Engineering Company, a corporation of Ohio
Filed Feb. 8, 1963, Ser. No. 257,157
14 Claims. (Cl. 310—105)

The invention relates in general to cooling of dynamoelectric machines and, more particularly, to forced air ventilation of dynamoelectric machines having a cylindrical rotatable drum as the air flow generating member.

Practically all dynamoelectric machines have the problem of dissipating waste heat and certain types of these machines such as eddy current clutches and brakes have a considerable problem since the very function of such a machine is to change mechanical power into heat which must be dissipated from the confines of the machine. Eddy current clutches, for example, are easily connected between a drive motor and a load where the drive motor is generally a constant speed device and the load requires variable speed with the clutch having variable slip to drive the load at the variable speed requirements.

A typical form of air cooled eddy current clutch currently available is one which uses axially parallel ventilating fins on the external periphery of the eddy current drum. These fins generate air movement by centrifugal action, to discharge the air generally radially outwardly but in a relatively inefficient manner. Also, the air intake to such axially parallel fins is generally from one axial end which causes considerable problems in mechanical design of the housing structure for the eddy current clutch. Since all of the slip loss in an eddy current clutch must be dissipated as heat, it is important that an efficient air flow be utilized and also an air flow which efficiently withdraws heat from the heat generating parts of the eddy current clutch.

Accordingly, an object of the invention is to provide a forced air cooling system of high efficiency for eddy current clutches.

Another object of the present invention is to provide an axial flow fan for cooling of an eddy current clutch.

Another object of the invention is to provide improved air cooling of an eddy current coupling wherein superior aerodynamic characteristics of fan blades are coupled with superior heat exchange characteristics and a higher mass flow of air through the coupling.

Another object of the present invention is to provide an air cooled eddy current clutch design wherein both end bells may be completely closed for close coupled connection at both ends to a drive motor and to a load.

Another object of the present invention is to provide an air cooled eddy current clutch with both intake and outlet air openings on the periphery of the housing.

Another object of the present invention is to provide a cooling system for a dynamoelectric machine wherein a majority of the air moved by an axial flow fan goes in intake openings and out through outlet openings in the housing and a minority of the air is recirculated within the housing for cooling other internal parts of the machine.

Another object of the present invention is to provide a dynamoelectric machine cooling system with an axial flow fan dissipating a majority of the heat from the fan blades and having two recirculating passageways to the intake end of the axial flow fan.

Another object of the present invention is to provide a cooling system for an eddy current clutch wherein recirculated air from an axial flow fan cools the pilot bearing deep within the clutch and cools the excitation coil for the magnetic circuit.

Another object of the present invention is to provide a cooling system for an eddy current clutch wherein air is directed by an axial flow fan over one peripheral surface of an eddy current drum and recirculated air is directed over the opposite peripheral surface of this drum.

Another object of the present invention is to provide an air cooled eddy current clutch wherein air is recirculated completely around the cross sectional periphery of a closed magnetic circuit surrounding the excitation coil of the clutch.

Other objects and a fuller understanding of this invention may be had by referring to the following description and claims, taken in conjunction with the accompanying drawings, in which:

Figure 1:
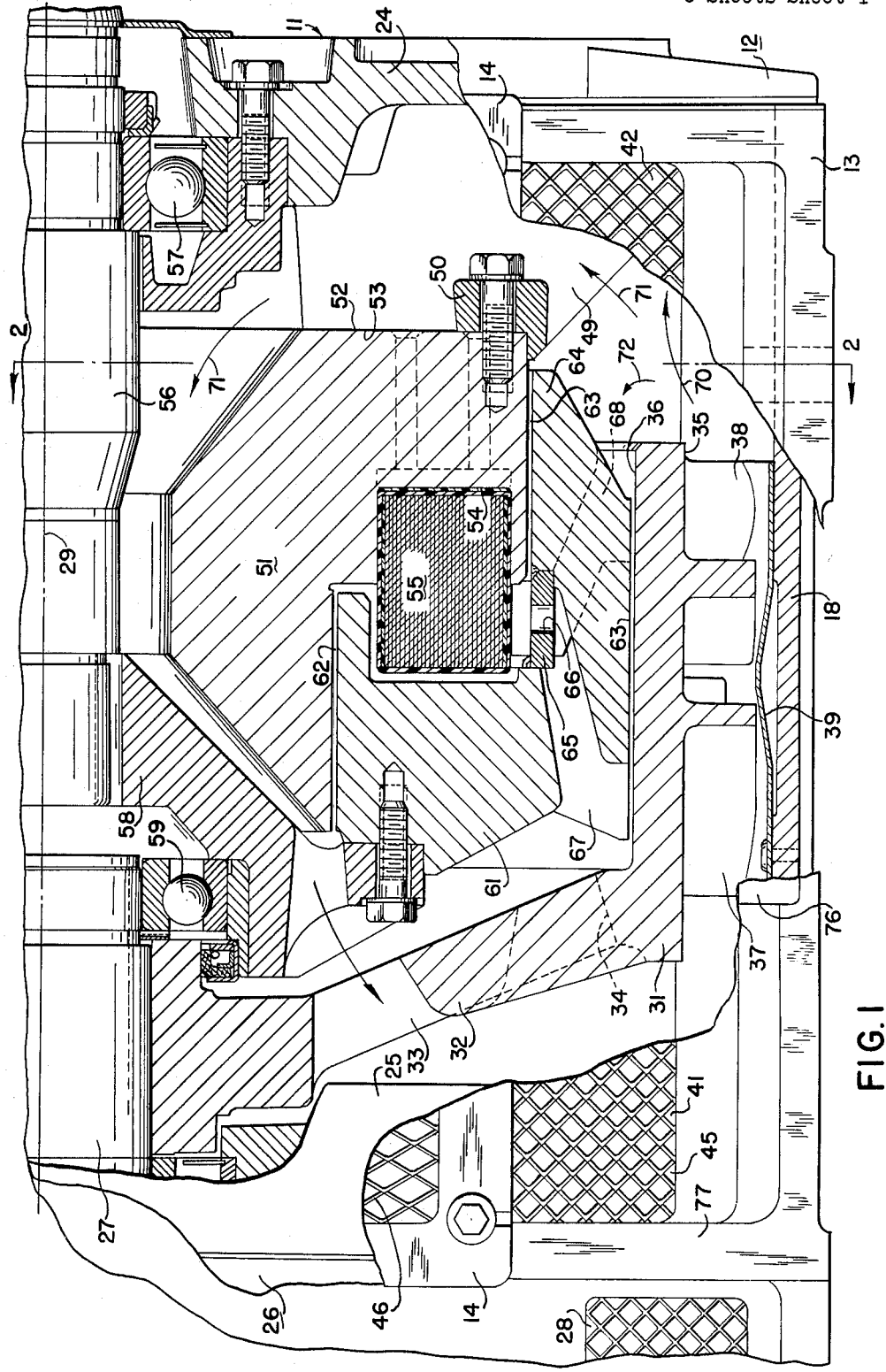
FIGURE 1 is a longitudinal cross sectional view of an eddy current clutch embodying the invention.
Figure 2:
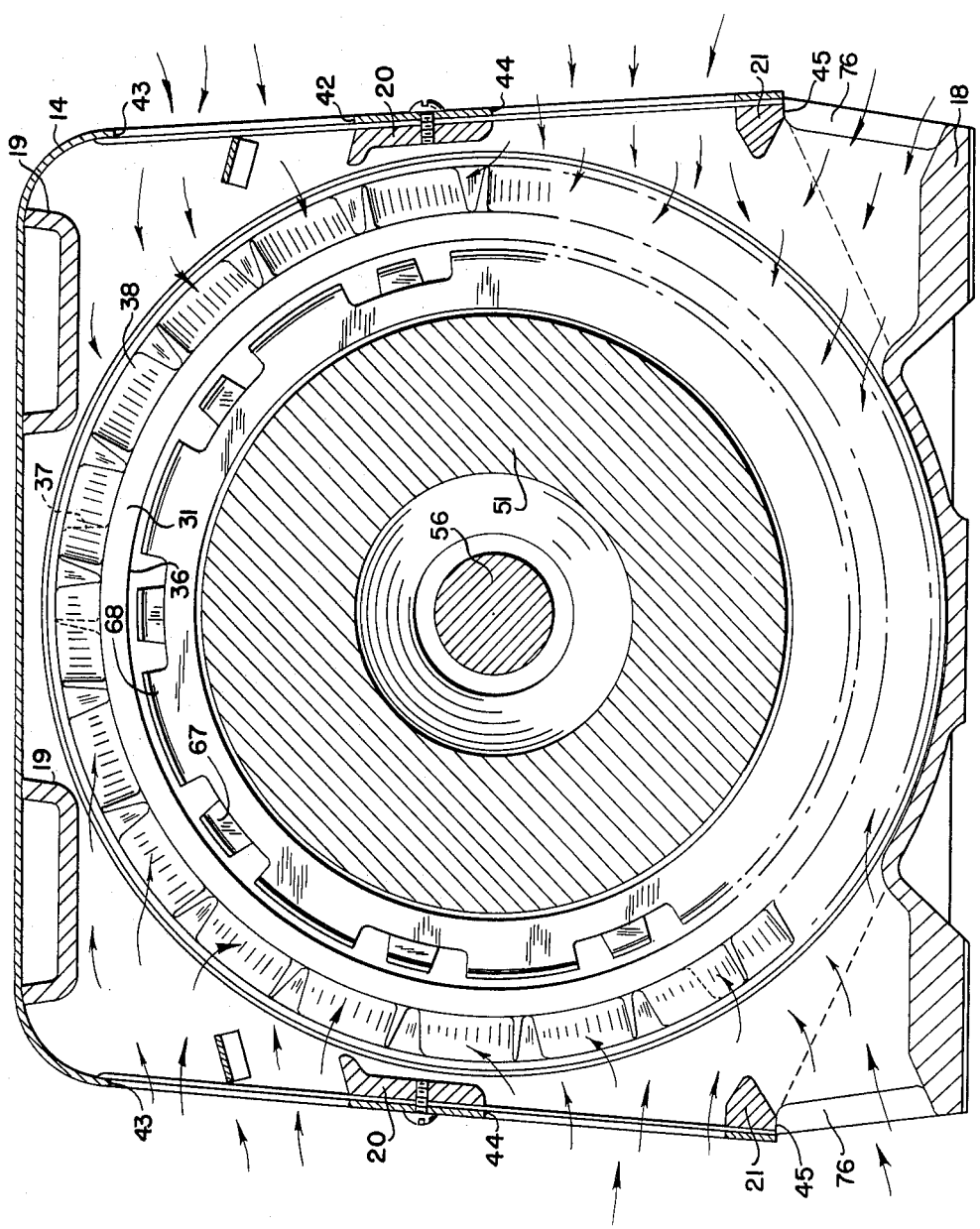
FIGURE 2 is a sectional view on the line 2—2 of FIGURE 1.
Figure 3:
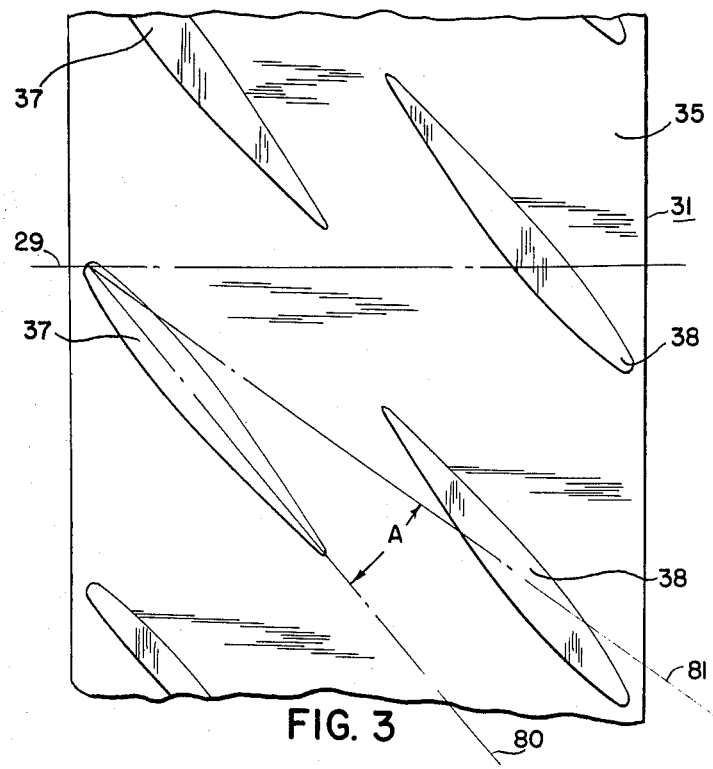
FIGURE 3 is a partial developed view of the fan blades on the eddy current drum; and, FIGURE 4 is a graph of operating conditions of the eddy current clutch.

FIGURES 1, 2 and 3 illustrate one form which the invention may take but this form is given for purpose of illustration and not limitation. The cooling system of the invention is shown as being embodied in a dynamoelectric machine 11 which is more specifically illustrated as an eddy current clutch. This eddy current clutch 11 has a housing 12 which is comprised of two parts, a frame 13 and a cover 14. The frame 13 may be a cast iron frame which includes rings at each end and a middle ring integrally joined by a base plate 18, top longitudinal members 19 and side longitudinal members 20 and 21. Thus, the frame 13 is a skeleton frame to which the cover 14 may be bolted to provide a protected enclosure formerly called a drip-proof enclosure. First and second end bells 24 and 25 are also part of the housing 12 and the end bell 25 does double duty of being the end bell for a drive motor 26. This drive motor 26 may be any suitable form of prime mover such as a substantially constant speed induction motor. The motor has a shaft 27 which is the input shaft of the eddy current clutch 11. The motor 26 may also be of drip-proof or protected design having air openings 28 in the lower half of the periphery near the end bell 25.

An eddy current drum 31 is carried on a drum support 32 in turn affixed to the input shaft 27. This drum support 32 has a first peripheral row of apertures 33 and a second peripheral row of apertures 34. The drums 31 has an outer cylindrical surface 35 and an inner cylindrical surface 36. The outer cylindrical surface 35 carries axial flow fan blades in first and second peripheral rows 37 and 38. These axial flow fan blades closely cooperate with a shroud 39 carried in the middle ring of the frame 13. This ring has a circular inner periphery to which the shroud 39 is fixed to preclude air circulation on the outside of the shroud 39 within the cover 14.

The housing 12 has first and secured peripheral rows of air openings 41 and 42, respectively. FIGURE 2 better shows the row of air openings 42 and these include openings 43 and 44 in the upper and lower portions, respectively, of the cover 14. There are also air openings 45 which are not in the cover 14, rather they are in the lower part of the frame 13. The first row of air openings 41 are similar to those shown in FIGURE 2. Each of these air openings is covered with air directional baffles formed from expanded metal screens 46. The screens 46 near the end bell 24 are shaped to direct outward air flow to the right as viewed in FIGURE 1 and the screens in the first row of air openings 41 are shaped to direct outward air flow to the left.

The end bell 24 has a plurality of axially parallel radial fins 49 integral therewith which integrally carry a mounting ring 50. A fixed magnetic core 51 has an end surface 52 bolted to a mounting surface 53 on these fins 49 and the mounting ring 50. The fixed core 51 has a coil mounting surface 54 to which an excitation coil 55 is abutted. This coil 55 is coaxial with the input shaft 27 and with an output shaft 56 journalled by a bearing 57 in the end bell 24. The output shaft 56 also carries a pilot bearing hub 58 with a pilot bearing 59 disposed between the hub 58 and the input shaft 27. Preferably this pilot bearing hub 58 is made from aluminum or some other non-magnetic material. Also, the end bell 24 is made from non-magnetic material such as aluminum to prevent degradation of the performance of the eddy current clutch 11 by leakage flux in undesired paths. The radial fins 49 and mounting ring 50 will also be aluminum in this case since integral with the end bell 24 and this has the added advantage of promoting good heat conductivity.

An output magnetic rotor 61 is carried on the bearing hub 58 and has two parasitic air gaps 62 and 63 with the fixed core 51. Portion 64 of this rotor 61 is a continuous magnetic ring carried on the main portion 61 by a non-magnetic ring 65 having apertures 66. A first set of teeth 67 are carried on the rotor 61 and a second set of teeth 68 are carried on the magnetic ring 64. These two sets of teeth are interdigitated for minimum magnetic cooperation therebetween but for a maximum magnetic cooperation with the inner surface 36 of the eddy current drum 31. Accordingly, there is a closed magnetic circuit formed around the longitudinal cross section of the excitation coil 55. This magnetic circuit is through the fixed magnetic core 51, the rotor portion 61, the first set of teeth 67, partially axially and peripherally through the drum 31, through the teeth 68 and the magnetic ring 64 to return to the fixed core 51.

FIGURE 3 is a partial developed view of the exterior surface of the eddy current drum 31 showing the first and second rows 37 and 38 of fan blades. Each of these fan blades has an air foil shape and they are reversed relative to each other so that each row faces an axial end of the drum 31. The first set of blades 37 are thus active upon clockwise rotation of the drum as viewed in FIGURE 2 to blow air in a first axial direction, which is to the right as viewed in FIGURE 1. This flow of air flows over the second set of fan blades 38; however, since this second set of fan blades is parallel to the first set but reversed thereto, this second set of fan blades is in a free wheeling condition which neither boots the air flow nor turbines to extract power from the air stream. However, heat is extracted from both sets of fan blades by this air flow and this is aided by turbulence of the air passing over the second set of fan blades 38. Upon counter-clockwise rotation of the drum 31, as viewed in FIGURE 2, the second set of fan blades 38 is the active blade group blowing air to the left as viewed in FIGURE 1 across the first set of fan blades 37 in a free wheeling condition. Accordingly, it will be seen that the first row of air openings 41 are air intake openings for clockwise rotation and the second row of air openings 42 are air intakes for counter-clockwise rotation.

The axial flow fan is an efficient device for high velocity and high volume of air delivery. Since the principal heat in the eddy current clutch is generated in the eddy current drum 31 and since these fan blades 37 and 38 are integral therewith there is good heat transfer thereto and good heat transfer to the air flowing past and generated by these fan blades. The eddy current drum, the fan blades and the drum support 32 may all be integrally cast from dynamo steel, for example, for good magnetic and strength characteristics.

The air flow has a main path 70 through the selected outlet air openings but also has a re-circulating path through first and second bypass passageways 71 and 72, respectively. The first bypass passageway 71 is radially inwardly through the space between the radial fins 49 which is confined by the end bell 24 and the face 53 of the core 51. This first bypass passageway 71 continues over the housing for the bearing 57 and between the axial space between the output shaft 56 and the inner periphery of the fixed core 51. It passes over the surface of the pilot bearing hub 58 to cool this pilot bearing 59 and passes out through the first row of apertures 33 in the drum support 32 to return to the other axial end of the axial flow fan. The second bypass passageway 72 passes adjacent the inner cylindrical surface 36 of the drum 31 by passing through the spaces between the interdigitated teeth 67 and 68 and then through the peripheral row of apertures 34 in the drum support 32 to return to the other axial end of the axial flow fan. Of course, with opposite drum rotation, the flow through the axial flow fan and these bypass passageways 71 and 72 is reversed.

The flow through the first bypass passageway 71 cools the coil 55 because heat from this coil 55 is transmitted generally axially through the fixed core 51 into the mounting ring 50 and radial fins 49 from which this heat is extracted by the air flow. Also, this air flow in bypass passageway 71 cools the bearing 57 and, more particularly, the pilot bearing 59 which is deep within the eddy current clutch 11. The air flow through the second bypass passageway 72 cools the teeth 67 and 68 and more importantly, the inner surface of the eddy current drum 31 at which most heat is generated. It has been found that the most efficient heat transfer for coolest running of all parts of the clutch 11 is established when about 20 to 25% of the air is re-circulated through the passageways 71 and 72 with about 75 or 80% of the air passing out through the air outlet openings such as the air openings 42. The division of air in the bypass passageways 71 and 72 is about 1:5. This means that about 4% of the total air flow goes through the first bypass passageway 71 and about 20% of the total air flow passes through the second bypass passageway 72.

There is also a small air flow through the apertures 66 past the coil 55 and through the air gap 62. This avoids a pocket of hot air adjacent the coil 55.

The lower central part of the frame 13 has a radially outward bulge 76 disposed between the first and second rows 41 and 42 of air openings. This further separates the air intake from the air outlet. The second end bell 25 has a transversely extended foot 77 between the lower air opening 45 in the row of openings 41 and the air opening 28 for the motor 26. This prevents air ingention into the motor air opening 28 when the air opening 45 is an air outlet and thus prevents overheating of the motor 26. The axial flow fan provides a high velocity of air out through the air outlets in the order of 2000 feet per minute which precludes recirculation of air outside the eddy current clutch 11. Accordingly, the extended foot 77, the radial bulge 76, the directional baffling provided by the metal screens 46 and the high velocity together cooperate to provide efficient cooling of the eddy current clutch 11 without recirculation of heated outlet air into the air inlets, yet keep this heated air out of the motor air openings 28. Further, it will be noted that both rows of air openings 41 and 42 are in the periphery of the housing 12 near the two axial ends of the eddy current drum 31 for a balanced design regardless of rotational direction. Also, this prevents complete closing of end bells 24 and 25 so that the clutch 11 may be mounted directly to and actually a part of the drive motor 26 and also may be mounted closely coupled to a load at the output shaft end.

Figure 4:
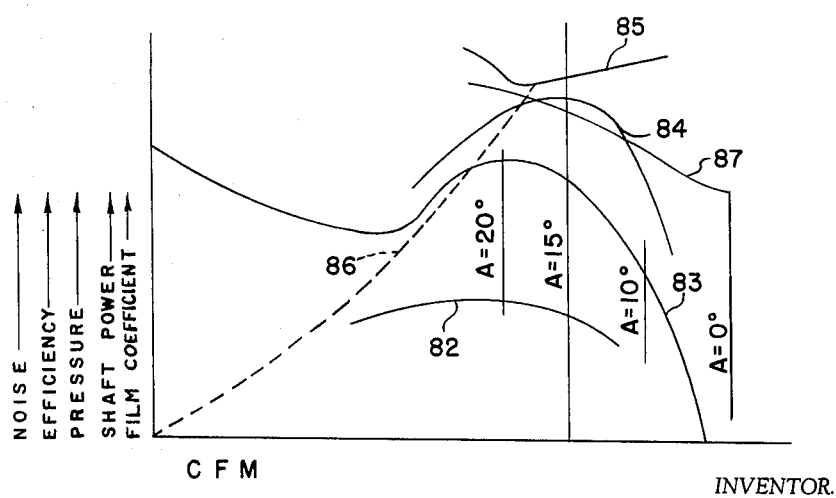

FIGURE 3 illustrates the mounting of the blades 37 and 38. The blades 37, for example, are mounted along an axis 80 which has an angle of incidence A relative to an axis 81 which is parallel to the relative velocity of the air flow. This angle of incidence A has been established at 15 degrees as giving the optimum of fan and heat exchanger performance. FIGURE 4 shows a graph of fan operating conditions. Curve 82 illustrates shaft power for the axial flow fan plotted against cubic feet per minute of air flow. Curve 83 illustrates static pressure rise plotted against air flow and curves 84 and 85 plot efficiency and noise versus air flow. A stall line is illustrated by curve 86 as a limiting factor toward increasing the angle of incidence. A curve 87 illustrates the air film heat transfer coefficient on the fan blades, as plotted against cubic feet per minute of air flow. These curves illustrate that the optimum fan performance in this case is achieved with an angle of incidence of 15 degrees. This gives maximum heat transfer consistent with good aerodynamic design and stable, quiet and efficient fan performance. It has been found that this design will dissipate 30% more energy in the form of heat than prior art designs using axially parallel blades on the outer periphery of the eddy current drum. Also, the axial flow fan has been found to be about 100% more effective in generating air flow than such prior art axially parallel blades.

The film coefficient curve 87 illustrates that one obtains about 25% greater heat transfer at a fan blade angle of incidence A of 15 degrees than at a zero degree angle.

This air film heat transfer coefficient may be considered to be inversely proportional to the thickness of the film of stagnant air next to the fan blades through which the heat must be conducted to the air stream. Since air is a poor conductor of heat, heat transfer is enhanced by making this film as thin as possible. An increase in the air film heat transfer coefficient of about 25% means that there is a proportionate reduction in the thermal gradient between the fan blades and the air stream. Accordingly, as compared with the prior art axially parallel fan blades, this shows the superior advantage of the axial flow fan of the present design which not only has superior aerodynamic characteristics but also superior heat exchanger characteristics, coupled with higher mass flow of air.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. An eddy current device comprising, in combination, a housing having an axis,
   a coaxial coil in said housing,
   a rotatable eddy current member coaxially in said housing on bearing means,
   a toothed member in said housing magnetically cooperating with said eddy current member,
   means including said eddy current member and said toothed member establishing a closed magentic circuit around said coil,
   an axial flow fan fixed on the periphery of said eddy current member and having a peripheral row of fan blades,
   air intake and outlet openings in said housing,
   said row of blades having an air foil shape and directed to blow air in a first axial direction upon rotation of said eddy current member in a first direction to blow air from said air intake openings out through said outlet openings to extract heat from said blades and directed to blow air over said bearing means to cool same.

2. An eddy current device comprising, in combination, a housing having an axis,
   a coaxial coil in said housing,
   coaxial shaft means journalled by bearing means in said housing,
   a rotatable eddy current drum on said shaft means coaxially in said housing and having an inner and an outer periphery,
   a toothed member in said housing magnetically cooperating with said drum,
   means including said drum and said toothed member establishing a closed magnetic circuit around said coil,
   an aixal flow fan fixed on one of said inner and outer periphery of said eddy current drum and having a peripheral row of fan blades,
   air intake and outlet openings in the periphery of said housing respectively located near the two axial ends of said eddy current drum,
   said row of blades having an air foil shape and directed to blow air in a first axial direction upon rotation of said drum in a first direction to blow air from said air intake openings out through said outlet openings,
   and a bypass air passageway extending around the cross sectional periphery of said closed magnetic circuit from one axial end of said eddy current drum to the other end to direct air over said bearing means to cool same.

3. An eddy current device comprising, in combination, a housing having an axis,
   a coaxial coil in said housing,
   a rotatable eddy current drum coaxially in said housing,
   a toothed member in said housing magnetically cooperating with said drum,
   means including said drum and said toothed member establishing a closed magnetic circuit around said coil,
   an axial flow fan fixed on the periphery of said eddy current drum and having a peripheral row of fan blades,
   air intake and outlet openings in the periphery of said housing respectively located near the two axial ends of said eddy current drum,
   said row of blades having an air foil shape and directed to blow air in a first axial direction upon rotation of said drum in a first direction to blow air from said air intake openings out through said outlet openings to extract heat from said blades,
   a radially outward bulge in the lower half of said housing between said openings to help separate air intake and outlet,
   and baffles in said openings and shaped to further direct the outlet air away from the air inlet and to draw the inlet air from a direction different from the air outlet.

4. An eddy current device comprising, in combination, a housing having an axis,
   a coaxial coil in said housing,
   an end bell in said housing,
   coaxial shaft means journalled by bearing means in said end bell,
   a rotatable eddy current drum on said shaft means coaxially in said housing,
   input drive means rotatable in said end bell and connected to rotate said eddy current drum,
   a toothed member in said housing magnetically cooperating with said drum,
   means including said drum and said toothed member establishing a closed magnetic circuit around said coil substantially enclosing same,
   an axial flow fan fixed on the periphery of said eddy current drum and having a peripheral row of fan blades,
   air intake and outlet openings around the periphery of said housing respectively located near the two axial ends of said eddy current drum,
   said row of blades having an air foil shape and directed to blow air in a first axial direction upon rotation of said drum in a first direction to blow air from said air intake openings out through said outlet openings to extract heat from said blades, a radially outward bulge in the lower half of said housing between said openings to help separate air intake and outlet, expanded metal screening covering said openings and shaped to further direct the outlet air away from the air inlet and to draw the inlet air from a direction different from the air outlet, a transversely extended external foot on the lower corners of said end bell to direct any said outlet air away from said input drive means.

5. An eddy current device comprising, in combination, a housing having an axis, a coaxial coil in said housing, a rotatable eddy current drum coaxially in said housing, a toothed member in said housing magnetically cooperating with a first peripheral surface of said drum, means including said drum and said toothed member establishing a closed magnetic circuit around said coil, an axial flow fan fixed on a second peripheral surface of said eddy current drum and having a peripheral row of fan blades, air intake and outlet openings around the periphery of said housing respectively located near the two axial ends of said eddy current drum, said row of blades having an air foil shape and directed to blow air in a first axial direction upon rotation of said drum in a first direction to blow air from said air intake openings out through said outlet openings to extract heat from said blades and said second peripheral surface of said drum, and a bypass passageway from one end of said eddy current drum, to the other including the spaces between the teeth of said member to direct air adjacent said first peripheral surface of said drum to cool same.

6. An eddy current device comprising, in combination, a housing having an axis, a coaxial coil in said housing, coaxial shaft means journalled by bearing means in said housing, a rotatable eddy current drum on said shaft means coaxially in said housing, and having an inner and an outer periphery, a toothed member in said housing magnetically cooperating with said drum, means including said drum and said toothed member establishing a closed magnetic circuit around said coil substantially enclosing same, an axial flow fan fixed on one of said inner and outer periphery of said eddy current drum and having a peripheral row of fan blades, air intake and outlet openings around the periphery of said housing respectively located near the two axial ends of said eddy current drum, said row of blades having an air foil shape and directed to blow air in a first axial direction upon rotation of said drum in a first direction to blow air from said air intake openings out through said outlet openings to extract heat from said blades, a first bypass air passageway extending around the cross sectional periphery of said closed magnetic circuit from one axial end of said eddy current drum to the other end to direct air over said bearing means to cool same, and a second bypass passageway from one end of said eddy current drum to the other including the spaces between the teeth of said member to direct air adjacent said drum to cool same.

7. An eddy current device comprising, in combination, a housing having an axis, a coaxial coil in said housing, a rotatable eddy current drum coaxially in said housing, a toothed member magnetically cooperating with one peripheral side of said drum, means including said drum and said toothed member establishing a closed magnetic circuit around said coil substantially enclosing same, an axial flow fan fixed on the other peripheral side of said eddy current drum and having first and second axially spaced peripheral sets of blades, said first set of blades having an air foil shape and directed to blow air in a first axial direction across said second set of blades in free wheeling condition upon rotation of said drum in a first direction, and said second set of blades having an air foil shape and directed generally parallel to said first set but reversed relative thereto to blow air in a second axial direction across said first set of blades in free wheeling condition upon rotation of said drum in the second rotational direction.

8. An eddy current clutch comprising, in combination, a housing having an axis, a coaxial coil in said housing, a rotatable eddy current drum coaxially in said housing, means including said drum and a toothed output rotor establishing a closed magnet circuit around said coil substantially enclosing same, an axial flow fan fixed on the outer cylindrical periphery of said eddy current drum and having first and second axially spaced peripheral sets of blades, first and second air openings around the periphery of said housing respectively located near the two axial ends of said eddy current drum, said first set of blades having an air foil shape and directed to blow air in a first axial direction across said second set of blades in free wheeling condition upon rotation of said drum in a first direction with air intake and outlet at said first and second air openings, respectively, and said second set of blades having an air foil shape and directed generally parallel to said first set but reversed relative thereto to blow air in a second axial direction across said first set of blades in free wheeling condition upon rotation of said drum in the second rotational direction with air intake and outlet at second and first air openings, respectively.

9. An eddy current clutch comprising, in combination, a housing having an axis, a coaxial coil in said housing, a rotatable eddy current drum coaxially in said housing, coaxial shaft means journalled by bearing means in said housing, an apertured support for said drum, a toothed output rotor on said shaft means, means including said drum and said toothed output rotor establishing a closed magnetic circuit around said coil substantially enclosing same, an axial flow fan fixed on the outer cylindrical periphery of said eddy current drum and having a peripheral row of fan blades, air intake and outlet openings around the periphery of said housing respectively located near the two axial ends of said eddy current drum, said row of blades having an air foil shape and directed to blow air in a first axial direction upon rotation of said drum in a first direction to blow air out through said outlet openings, a first bypass air passageway extending around the cross sectional periphery of said closed magnetic circuit from one axial end of said eddy current drum to the other end and including apertures in said drum support to direct air over said bearing means to cool same, and a second bypass passageway from one end of said eddy current drum to the other including a passageway through apertures in said eddy current drum support and through the spaces between said rotor teeth to direct air adjacent said drum to cool same.

10. An eddy current clutch comprising, in combination, a housing having an axis,
 a coaxial coil in said housing,
 a rotatable eddy current drum coaxially in said housing,
 an apertured support for said drum,
 means including said drum and a toothed output rotor establishing a closed magnetic circuit around said coil substantially enclosing same,
 an axial flow fan fixed on the outer cylindrical periphery of said eddy current drum and having first and second axially spaced sets of blades,
 said first set of blades having an air foil shape and directed to blow air in a first axial direction across said second set of blades in free wheeling condition upon rotation of said drum in a first direction,
 said second set of blades having an air foil shape and directed generally parallel to said first set but reversed relative thereto to blow air in a second axial direction across said first set of blades in free wheeling condition upon rotation of said drum in the second rotational direction,
 air intake and outlet openings around the periphery of said housing respectively located near the two axial ends of said eddy current drum,
 a first bypass air passageway extending around the cross sectional periphery of said closed magnetic circuit from one axial end of said eddy current drum to the other end and including apertures in said drum support,
 a second bypass passageway from one end of said eddy current drum to the other including a passageway through apertures in said eddy current drum support and through the spaces between said rotor teeth,
 said first bypass passageway taking a minority of the outlet air from said axial flow fan,
 said second bypass passageway taking a minority of the outlet air from said axial flow fan and the balance of the air exiting through said air outlet openings in said housing.

11. An eddy current clutch comprising, in combination, a housing having an axis,
 a rotatable eddy current drum coaxially in said housing,
 an apertured support for said drum,
 a coaxial output shaft in said housing,
 an end bell in said housing,
 axially parallel radial mounting fins on said end bell,
 a coaxial fixed core in said housing on said radial fins and radially spaced from said output shaft,
 a stationary coil cooperating with said fixed core,
 an output rotor on said output shaft and having teeth cooperating with an inner cylindrical surface on said drum,
 said rotor and drum establishing with said fixed core a closed magnetic circuit around said coil substantially enclosing same,
 an axial flow fan fixed on the outer cylindrical periphery of said eddy current drum and having first and second axially spaced sets of blades,
 said first set of blades having an air foil shape and directed to blow air in a first axial direction upon rotation of said drum in a first direction,
 said second set of blades having an air foil shape and directed generally parallel to said first set but reversed relative thereto to blow air in a second axial direction upon rotation of said drum in the second rotational direction,
 air intake and outlet openings around the periphery of said housing respectively located near the two axial ends of said eddy current drum,
 a bypass air passageway extending around said closed magnetic circuit from one axial end of said eddy current drum to the other end including the spaces between said radial fins and a generally axial passageway between said outlet shaft and said fixed core in addition to said apertured drum support,
 said bypass passageway taking about less than 50% of the outlet air from said axial flow fan and a majority of the air exiting through said air outlet openings in said housing.

12. An eddy current clutch comprising, in combination, a housing having an axis,
 a rotatable eddy current drum coaxially in said housing,
 an apertured support for said drum,
 a coaxial output shaft in said housing,
 an end bell in said housing,
 axially parallel radial mounting fins on said end bell,
 a coaxial fixed core in said housing on said radial fins and radially spaced from said output shaft,
 a stationary coil cooperating with said fixed core,
 an output rotor on said output shaft and having interdigitated teeth cooperating with an inner cylindrical surface on said drum,
 said rotor and drum establishing with said fixed core a closed magnetic circuit around said coil substantially enclosing same,
 an axial flow fan fixed on the outer cylindrical periphery of said eddy current drum,
 air intake and outlet openings around the periphery of said housing respectively located near the two axial ends of said eddy current drum,
 a first bypass air passageway extending around said closed magnetic circuit from one axial end of said eddy current drum to the other end including the spaces between said radial fins and a generally axial pasageway between said output shaft and said fixed core in addition to said apertured drum support,
 a second bypass passageway from one end of said eddy current drum to the other including a passageway through apertures in said eddy current drum support and through the spaces between said interdigitated teeth,
 said first and second bypass passageways taking about 25% of the outlet air from said axial flow fan and the balance of the air exiting through said air outlet openings in said housing.

13. An eddy current clutch comprising, in combination, a housing having an axis,
 an eddy current drum coaxially in said housing and rotatable at a substantially constant speed,
 an apertured transverse support for said drum,
 a coaxial output shaft in said housing,
 a coaxial fixed core in said housing radially spaced from said output shaft,
 a stationary coil cooperating with said fixed core,
 an output rotor on said output shaft and having interdigitated teeth and establishing a closed magnetic circuit with said fixed core and drum around said coil substantially enclosing same,
 said teeth magnetically cooperating with an inner cylindrical surface on said drum,
 an axial flow fan fixed on the outer cylindrical periphery of said eddy current drum and having first and second axially spaced sets of blades,
 said first set of blades having an air foil shape and directed to blow air in a first axial direction across said second set of blades in free wheeling condition upon rotation of said drum in a first direction,
 said second set of blades having an air foil shape and directed generally parallel to said first set but reversed relative thereto to blow air in a second axial direction across said first set of blades in free wheeling condition upon rotation of said drum in the second rotational direction, first and second sets of air openings around the periphery of said housing respectively located near the two axial ends of said eddy current drum with one set being air intake and the other being air outlet depending upon drum rotational direction, an end bell in said housing, axially parallel radial mounting fins mounting said fixed core on said end bell, a first bypass air passageway extending around said closed magnetic circuit from one axial end of said eddy current drum to the other end including the spaces between said radial fins and a generally axial passageway between said output shaft and said fixed core in addition to said apertured drum support, a second bypass passageway from one end of said eddy current drum to the other including a passageway through apertures in said eddy current drum support and through the spaces between said interdigitated teeth, said first bypass passageway taking about 4% of the outlet air from said axial flow fan, said second bypass passageway taking about 20% of the outlet air from said axial flow fan and the balance of the air exiting through the exit ones of said first and second sets of air openings in said houing.

14. An eddy current clutch comprising, in combination, a housing having an axis, an eddy current drum coaxially in said housing and rotatable at a substantially constant speed, an apertured transverse support for said drum, a coaxial output shaft in said housing, a coaxial fixed core in said housing radially spaced from said output shaft, a stationary coil cooperating with said fixed core, an output rotor on said output shaft and having interdigitated teeth and establishing a closed magnetic circuit with said fixed core and drum around said coil substantially enclosing same, said teeth magnetically cooperating with an inner cylindrical surface on said drum, an axial flow fan fixed on the outer cylindrical periphery of said eddy current drum and having first and second axially spaced sets of blades, said first set of blades having an air foil shape and directed to blow air in a first axial direction across said second set of blade in free wheeling condition upon rotation of said drum in a first direction, said second set of blades having an air foil shape and directed generally parallel to said first set but reversed relative thereto to blow air in a second axial direction across said first set of blades in free wheeling condition upon rotation of said drum in the second rotational direction, first and second sets of air openings around the periphery of said housing respectively located near the two axial ends of said eddy current drum with one set being air intake and the other being air outlet depending upon drum rotational direction, a radial bulge in the lower half of said housing between said openings to help separate air intake and outlet, expanded metal screening covering said openings and shaped to further direct the outlet air away from the air inlet and to draw the inlet air from a direction different from the air outlet, first and second end bells in said housing, input drive means rotatable in said second end bell and connected to rotate said eddy current drum, a transversely extended foot on the lower corners of said second end bell to direct any said outlet air away from said input drive means, axially parallel radial mounting fins mounting said fixed core on said first end bell, a first bypass air passageway extending around said closed magnetic circuit from one axial end of said eddy current drum to the other end including the spaces between said radial fins and a generally axial passageway between said output shaft and said fixed core in addition to said apertured drum support, a second bypass passageway from one end of said eddy current drum to the other including a passageway through apertures in said eddy current drum support and through the spaces between said interdigitated teeth, said first bypass passageway taking about 4% of the outlet air from said axial flow fan, and said second bypass passageway taking about 20% of the outlet air from said axial flow fan and the balance of the air exiting through the outlet ones of said first and second sets of air openings in said housing.

References Cited by the Examiner
UNITED STATES PATENTS

| | | | |
|---|---|---|---|
| 2,484,138 | 10/1949 | Winther | 310—105 |
| 3,020,427 | 2/1962 | Wheeler et al. | 310—105 |

ORIS L. RADER, *Primary Examiner.*

L. L. SMITH, *Assistant Examiner.*